United States Patent [19]
Nevo

[11] Patent Number: 6,023,400
[45] Date of Patent: Feb. 8, 2000

[54] SAFETY ADAPTER FOR UNGROUNDED ELECTRICAL SOCKET

[76] Inventor: Hayim Nevo, 3/7 Haroshet, 27000 Kiryat Bialik, Israel

[21] Appl. No.: 09/161,605

[22] Filed: Sep. 28, 1998

Related U.S. Application Data

[63] Continuation-in-part of application No. PCT/IL97/00107, Mar. 24, 1997.

[30] Foreign Application Priority Data

Mar. 28, 1996 [IL] Israel ........................................ 117705

[51] Int. Cl.⁷ ..................................................... H02H 3/00
[52] U.S. Cl. ............................... 361/42; 361/45; 361/115
[58] Field of Search .................................. 361/42, 46, 44, 361/45, 43, 47, 50, 86, 88, 115; 324/510

[56] References Cited

U.S. PATENT DOCUMENTS

| | | | |
|---|---|---|---|
| 4,398,188 | 8/1983 | Feigal | 340/650 |
| 4,506,260 | 3/1985 | Woodruff | 361/99 |
| 5,606,480 | 2/1997 | Nevo | 361/46 |

FOREIGN PATENT DOCUMENTS

| | | | |
|---|---|---|---|
| 0695015 | 1/1996 | European Pat. Off. | H02H 5/12 |
| 2468130 | 4/1981 | France | C01R 31/34 |
| 9531028 | 11/1995 | WIPO | H02H 5/10 |

*Primary Examiner*—Stephen W Jackson
*Attorney, Agent, or Firm*—Browdy and Neimark

[57] ABSTRACT

A protection device for use in conjunction with an electrical appliance having an electrically conductive outer casing and which protects against the casing becoming "live" regardless of the state of a ground connection (GND) associated with an electrical socket to which the appliance is connected. A virtual ground connection is electrically floating with respect to the ground connection (GND) of the electrical socket, and is electrically coupled to the casing of the electrical appliance instead of the ground connection of the electrical socket. A differential comparator circuit compares a fraction of the voltage between the live and neutral connections with a voltage at the virtual ground connection of the appliance, producing a fault signal if a difference between the two voltages exceeds a predetermined threshold. A main feeder interruption device is operatively coupled to the differential comparator circuit, being responsive to the fault signal for opening a switching device connected in at least one of the live and neutral connections.

18 Claims, 3 Drawing Sheets

SAFETY ADAPTER FOR UNGROUNDED ELECTRICAL SOCKET

This application is a continuation-in-part of copending parent application No. PCT/IL97/00107, filed Mar. 24, 1997.

FIELD OF THE INVENTION

This invention is related to electrical protection systems associated with earth fault loops.

BACKGROUND OF THE INVENTION

The use of earth leakage circuit breakers (ELCBs) is well known to protect against earth leakage in an appliance having an electrically conductive housing which is connected to ground. In such case, if a fault occurs in the appliance whereby the casing becomes live, then the earth leakage current flows to ground and immediately operates the ELCB. However, if the ground connection is faulty such that there is no leakage path for current to flow in the event that the casing becomes live, then the ELCB will not become energized until somebody touches the electrically conductive housing and thereby provides a leakage path to ground. In such case, the leakage current passes through the person giving rise to the required imbalance between the live and neutral feeder currents which causes the ELCB to operate. Under these circumstances, whilst the ELCB will still operate, there is an inevitable earth leakage through the person who touches the appliance.

In order to address this drawback, published PCT application No. WO 95/31028, in the name of the present applicants, discloses a detector for monitoring the integrity of a ground connection to an electrical appliance having live and neutral terminals for feeding current to the appliance from respective live and neutral feeders of an electrical supply having a ground point for connecting to the ground terminal of the appliance. The detector comprises a differential comparator circuit for comparing a voltage at the neutral connection with a voltage at the ground terminal of the appliance and producing a fault signal if a difference therebetween exceeds a predetermined threshold. A switching device is connected in at least one of the live and neutral connections so as to be opened by a relay operatively coupled to the detector and responsive to the fault signal produced thereby.

The detector disclosed in WO 95/31028 is much more reliable than hitherto proposed ELCBs to protect against electric shock in the event of a poor ground connection. However, for the appliance to operate, a functional ground connection is still required. Thus, if there is no ground connection or its impedance is too high, then the detector disclosed in WO 95/31028 trips the supply to the appliance in order to prevent the risk of electric shock.

This means that if the ground connection to an electrical socket is impaired, then no electric power is available from the socket until a good ground protection is restored. Such repair is obviously only within the capabilities of skilled personnel and thus results in delays and inconvenience to the consumer whilst the socket is unusable. Furthermore, the detector disclosed in WO 95/31028 is associated with an electrical appliance and not with an electrical socket outlet, thus effectively increasing the cost of the appliance.

Yet a further consideration relates not so much to the integrity of the ground connection, but rather to the insulation between the ground and live connections. In an installation conforming to accepted standards, the impedance between the live and ground feeders is in excess of 1.5 MΩ. However, old installations having many appliances connected thereto are known wherein the impedance between the live and ground feeders can fall to such a low level that the ground feeder, far from protecting a user, can actually conduct fatal leakage current to the metal casing of an appliance.

One known approach to the problems outlined above has been to employ ELCBs but to do away altogether with the ground connection. To this end, so-called "double insulated" appliances are provided wherein all the electrical connections to the appliance are shielded from the outer casing by means of an inner, electrically insulating casing, which itself is spaced apart from the outer casing usually by means of electrically insulating spacers. There is then no need for a ground connection and only live and neutral connections, via a standard two-core cable, are provided.

Although this solution is effective, it increases the cost of the appliance. Moreover, typically the electrically insulating material employed in such appliances is thermosetting plastics which are environmentally unfriendly.

It would clearly be desirable to enjoy the advantages of the detector disclosed in WO 95/31028 whilst, at the same time, not incapacitating an electrical socket outlet whose ground connection is impaired and preferably not requiring integration within an electrical appliance.

EP 695 105 discloses a protection device for use in conjunction with an electrical appliance so as to protect against the casing thereof becoming "live". The electrical appliance has a ground connection 33, which might be the metal casing of the appliance, which is connected via a resistor R1 to a protection circuit comprising elements EC2, EC3, EC4 and OC1 so that if the leakage current flowing through R1 exceeds a certain threshold, this protection circuit provides a trigger to a relay coil RL1 so as to open the primary switch contacts SW1 and SW2. Thus, the protection circuit produces a fault signal if the ground impedance falls below a predetermined threshold.

Likewise, FR 2468430 discloses a protection device wherein, as in above-described EP 695 105, the principle of operation is that, in the event of a ground fault, there will be a leakage current flowing through the ground connection and the magnitude of this leakage current is employed in order to provide a trip signal for the main circuit breaker(s). It is true that in the case of a regular ground fault between either the live or neutral feeders and GND, the resulting ground leakage current which flows through the virtual ground connection effects adequate protection. Therefore, if all that is of concern is ground leakage owing to what is normally referred to as a phase-fault, then the circuits of EP 695 105 and FR 2468430 provide protection of acceptable scope.

However, in the event of a short-circuit between the live and neutral connections, there will under normal circumstances be no ground leakage current and therefore the circuits described in EP 695 105 and FR 2468430 will afford no protection. This is a very serious drawback because short-circuit faults represent a significant risk of fire.

SUMMARY OF THE INVENTION

It is an object of the invention to provide a protection device for use in conjunction with an electrical appliance having an electrically conductive outer casing and which protects against the casing becoming "live" regardless of the state of the ground connection associated with an electrical socket to which the appliance is connected.

In accordance with the invention there is provided a protection device for use in conjunction with an electrical appliance having an electrically conductive outer casing and which protects against the casing becoming "live" regardless of the state of a ground connection associated with an electrical supply to which the appliance is connected, the electrical appliance having live and neutral terminals for feeding current to the appliance from respective live and neutral feeders of the electrical supply, said device comprising:

- a virtual ground connection which is electrically floating with respect to said ground connection of the electrical supply, said virtual ground connection for electrically coupling to the casing of the electrical appliance instead of the ground connection of the electrical supply, and
- a differential comparator circuit for comparing a fraction of the voltage between the live and neutral connections with a voltage at the virtual ground connection of the appliance and producing a fault signal if a difference between said voltages exceeds a predetermined threshold.

Owing to the provision of a differential comparator, the present invention also affords protection in the event of a short-circuit between live and neutral. It is to be noted that, in the event of a short-circuit between live and neutral, the fractional voltage fed to the differential comparator is substantially zero and, therefore, the difference in that fractional voltage with the ground voltage is sufficiently high to allow for the ground protection of the present invention to operate.

For this reason, the use of a differential comparator leads to a fundamental and surprising improvement over the circuits taught by EP 695 105 and FR 2468430.

In practice, the fractional voltage between the live and neutral feeders is derived via a voltage divider comprising a symmetrical resistor network. No such symmetry is suggested, or contemplated, in EP 695 105 and FR 2468430 because in both cases operation of the respective protection circuits is conditional on the magnitude of the ground leakage current. Specifically, in EP 695 105 the current flowing through R1 results in operation of the relay RL1; whilst in FR 2468430 the current flowing through the resistor 20 into the base of the bipolar junction transistor 18 operates the relay 22. Thus, it is reiterated, that both EP 695 105 and FR 2468430 function only on the basis of the magnitude of the ground leakage current and, since it is only the magnitude of the ground leakage current which is of importance, there is clearly no need to compare the ground leakage current with a predetermined threshold. Consequently, no differential comparison is employed in EP 695 105 and FR 2468430; nor does differential comparison in EP 695 105 and FR 2468430 have any meaning. The substitution of differential comparison for the circuits proposed in EP 695 105 and FR 2468430 thus affords an unexpected and significant improvement.

In the invention, the fault signal may be used to provide a fault indication and to take suitable remedial action. To this end, there is preferably further included a main feeder interruption device such as an ELCB or contactor operatively coupled to the ground impedance measuring circuit and being responsive to the fault signal for opening a switching device connected in at least one of the live and neutral connections.

Preferably, the protection device is provided within an adapter for coupling an appliance to a standard socket outlet, thereby obviating any need to integrate the protection device within the appliance and also rendering it independent of the socket outlet. If desired, however, the protection device may be integral with either the appliance, the plug or the electrical socket outlet. In any case, the protection device does not prevent operation of appliances having only live and neutral connections which do not need grounding.

BRIEF DESCRIPTION OF THE DRAWINGS

In order to understand the invention and to see how it may be carried out in practice, there will now be described an adapter for providing a virtual ground connection to an appliance connected to an ungrounded supply, by way of non-limiting example only and with reference to the accompanying drawings, in which.

DETAILED DESCRIPTION OF A PREFERRED EMBODIMENT

Figure 1:
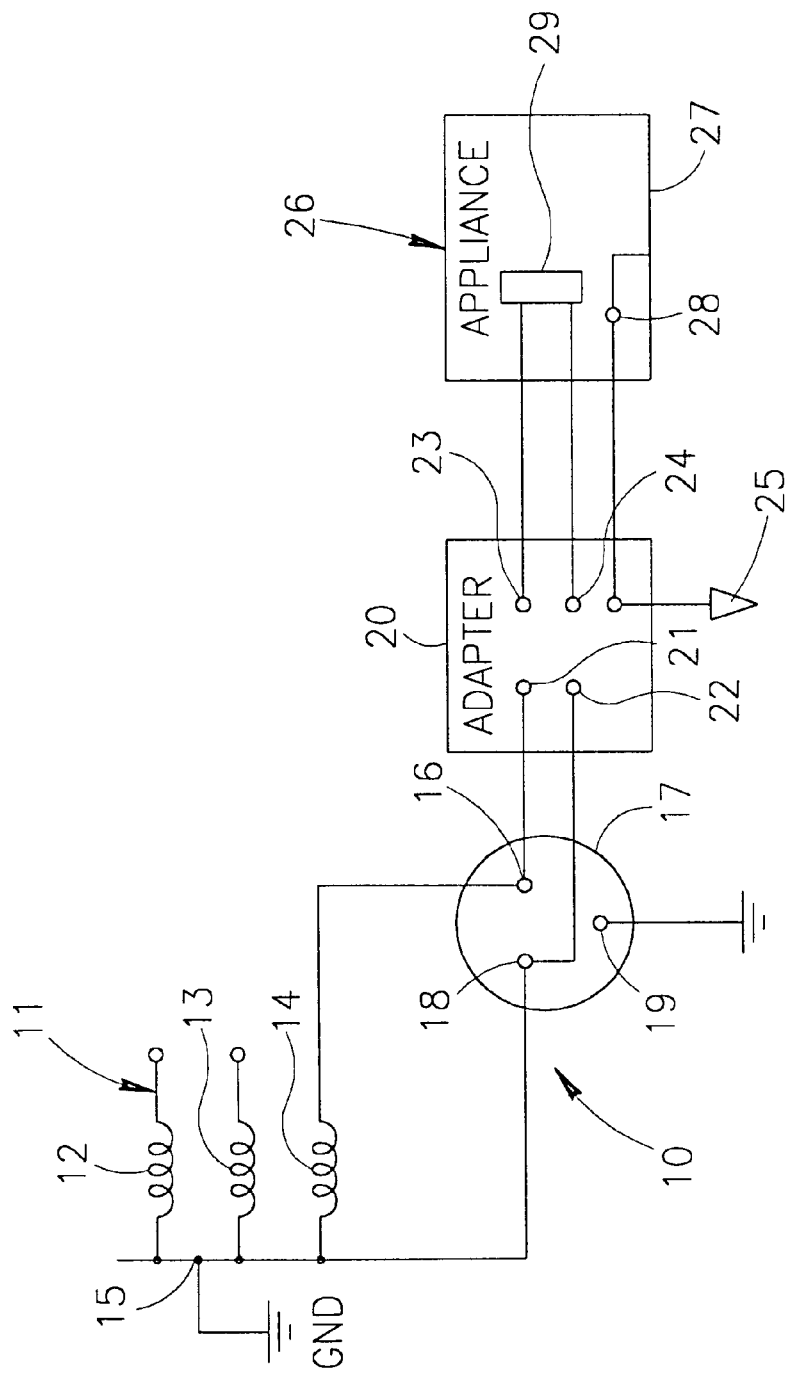
FIG. 1 is a schematic representation of an appliance connected to a socket outlet via an adapter according to the invention.

FIG. 1 shows a system 10 comprising an electrical supply 11 having three phases 12, 13 and 14 commonly connected in star formation to a neutral feeder 15 which itself is connected to ground, GND. One of the phase connections 14 constitutes a live feeder which is connected to a live outlet 16 of a socket 17 having a neutral outlet 18 connected to the neutral feeder 15 and a ground outlet 19 connected to GND.

An adapter designated generally as 20 has live and neutral inlet pins 21 and 22 for respectively connecting to the live and neutral socket outlets 16 and 18. The adapter 20 is not connected to the ground outlet 19 of the socket 17 but is provided with live, neutral and ground outlets 23, 24 and 25, respectively, to which are coupled corresponding connections of an appliance 26 having a metal casing 27 connected to a ground point 28 and having an internal circuit 29 for connecting across the live and neutral adapter outlets 23 and 24, respectively. The ground outlet 25 of the adapter 20 is floating relative to GND and constitutes a "virtual ground connection" which, under healthy conditions, should be substantially at the same potential as the neutral inlet pin 21.

By Ohm's Law, the impedance of a device is equal to the voltage across the device divided by the current flowing therethrough. Thus, if there is no earth leakage to the casing 27 of the appliance 26, then the impedance between the virtual ground connection 25 and the live adapter outlet 23 is extremely high. Specifically, if the phase voltage is 220 V and the maximum permitted safe leakage current is 0.9 mA, then the impedance is typically in excess of 250 KΩ. However, in the event of a fault in the appliance 26, such that the leakage current from the live adapter outlet 23 to the casing 28 of the appliance 26 and hence to the virtual ground connection 25 rises, the impedance drops accordingly. The impedance between the live adapter outlet 23 and the virtual ground connection 25 thus serves as a measure of whether there is an unsafe earth leakage to the casing 27 of the appliance 26.

Since the virtual ground connection 25 is floating relative to GND, the integrity or lack of integrity of the ground connection to the neutral feeder 15 of the electrical supply 11 is no longer significant. Specifically, the provision of a sound ground connection GND or the lack of such provision is not relevant: in either case fast interruption of the supply feeders 14 and 15 to the appliance 26 is ensured within no more than several milli-seconds. Even were the live feeder 14 to short-circuit with the virtual ground connection 25, the circuit would be interrupted without any danger of fire. This represents a fundamental departure from hitherto proposed protection systems where a short-circuit between the live feeder 14 and the ground connection, GND or the neutral connection 15 would represent a significant risk of fire. For example, with an electrical resistance of 20 Ω in the safety circuit at a voltage of 230 V, the short-circuit current would be 12.5 A (by Ohm's Law). In a single-phase circuit having a fuse of 16 A, the fuse would not blow and therefore a local heating at the fault location equal to 2.5 kW would ensue: more than sufficient to cause a fire.

Figure 2:
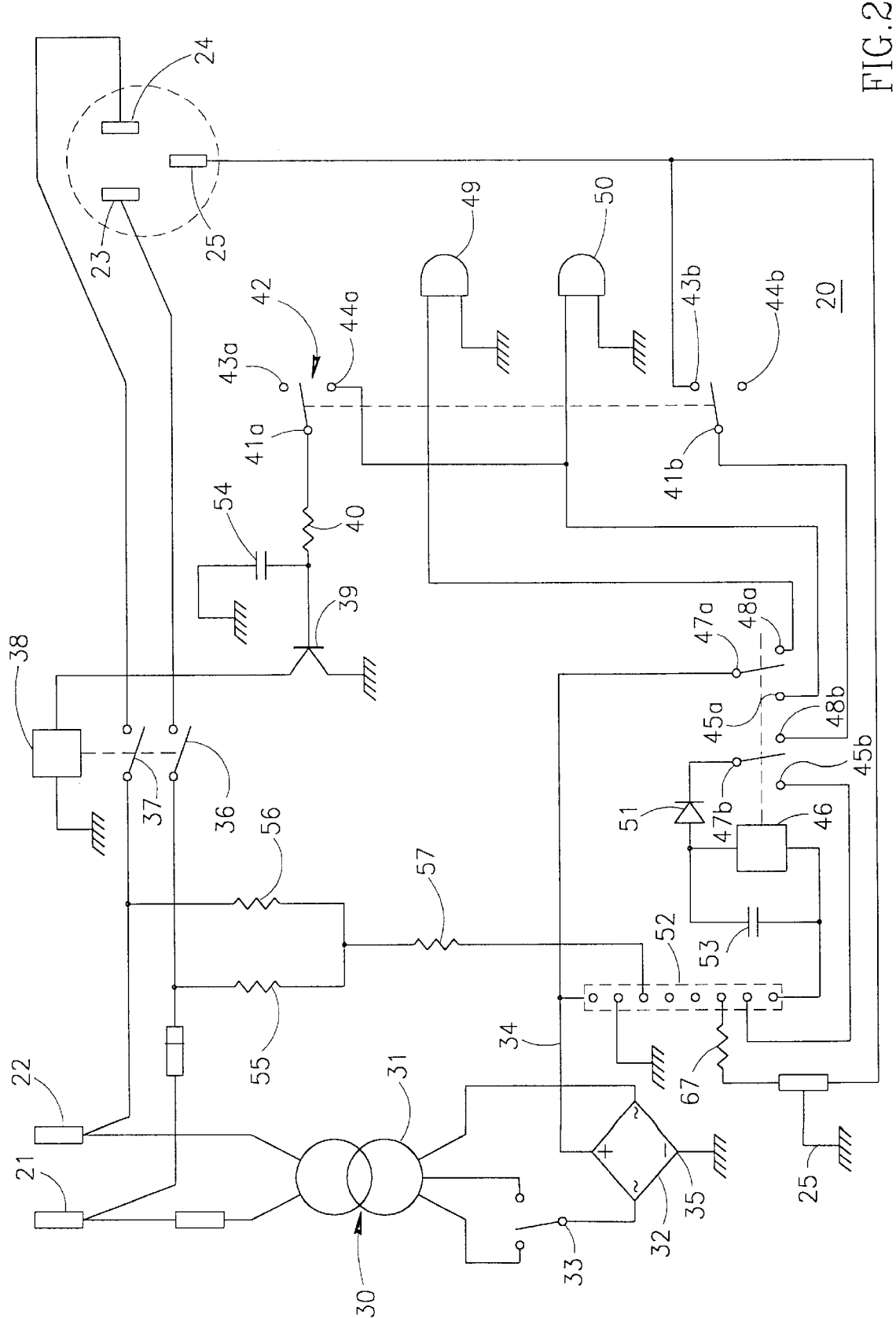
FIG. 2 is a circuit diagram showing schematically the adapter of FIG. 1 connected between an incoming electrical supply and the socket outlet.

Referring now to FIG. 2 there is shown a circuit diagram of the adapter 20. Connected across the live and neutral inlets 21 and 22 is an isolation transformer 30 having a tapped secondary winding 31 for stepping down a primary voltage of 110 or 220 V to approximately 10 V across respective taps. A d.c. bridge rectifier 32 is connected to an appropriate one of the tapped secondary windings via a selector switch 33 and produces an output voltage of approximately 12 V d.c. across a high voltage rail 34 and a low voltage rail 35 constituting, respectively, supply and ground rails. So far as the adapter 20 is concerned, all ground connections constitute the "virtual" ground to which the appliance 26 (shown in FIG. 1) is connected and thus in the following detailed description of the adapter 20 the terms "ground" and "virtual ground" will be used interchangeably.

The live and neutral inlets 21 and 22 are also connected via corresponding switches 36 and 37 to the live and neutral adapter outlets 23 and 24, respectively. The switches 36 and 37 constitute switching devices which are simultaneously operated by a relay coil 38 (constituting a main feeder interruption means which may be a contactor or ELCB) connected between ground and the collector of an NPN bipolar junction transistor 39 whose emitter is connected to ground and whose base is connected via a resistor 40 to a first pole 41a of a two-pole, two-way manual selector switch 42 having a second pole 41b and respective first "test" and "normal" contacts 43a and 44a as well as respective second "test" and "normal" contacts 43b and 44b. The first "test" contact 43a is floating whilst second "test" contact 43b is connected to ground. The first "normal" contact 44a is connected to a first normally open switch contact 45a of a two-pole changeover switch operated by a relay coil 46 (constituting an "actuator") and having a first pole 47a and a first normally closed switch contact 48a and having a second pole 47b and corresponding second normally open and closed switch contacts 45b and 48b, respectively. The second pole 41b of the manual selector switch is connected to the second normally closed switch contact 48b and the second "normal" contact 44b of the manual selector switch 42 is floating.

The first pole 47a of the changeover switch is connected to the positive low voltage d.c. supply rail 34 whilst the first normally closed switch contact 48a is connected to one end of a fault indication lamp 49 whose other end is connected to ground. Likewise a healthy indication lamp 50 is connected between ground and the first normally open switch contact 45a. The second pole 47b of the changeover switch is connected via a rectifier diode to the one end of the relay coil 46, a second end of which is connected to the positive low voltage d.c. supply rail 34 via a detector circuit depicted generally as 52 and described in greater detail below with reference to FIG. 3 of the drawings.

A filter capacitor 53 is connected across the relay coil 46. Likewise, for the sake of completeness, a filter capacitor 54 is shown connected between the base of the bipolar junction transistor 39 and ground. Connected between the live and neutral inlets 21 and 22 is a voltage divider comprising a pair of resistors 55 and 56 whose common junction is coupled via a current limiting resistor 57 to one input of a differential comparator within the detector 52 and whose second input is connected to ground. Thus, the differential comparator compares a fraction of the voltage between the live and neutral inlets 21 and 22 to the voltage on the virtual ground connection 25 which itself is connected to the casing 27 of the appliance 26.

Figure 3:
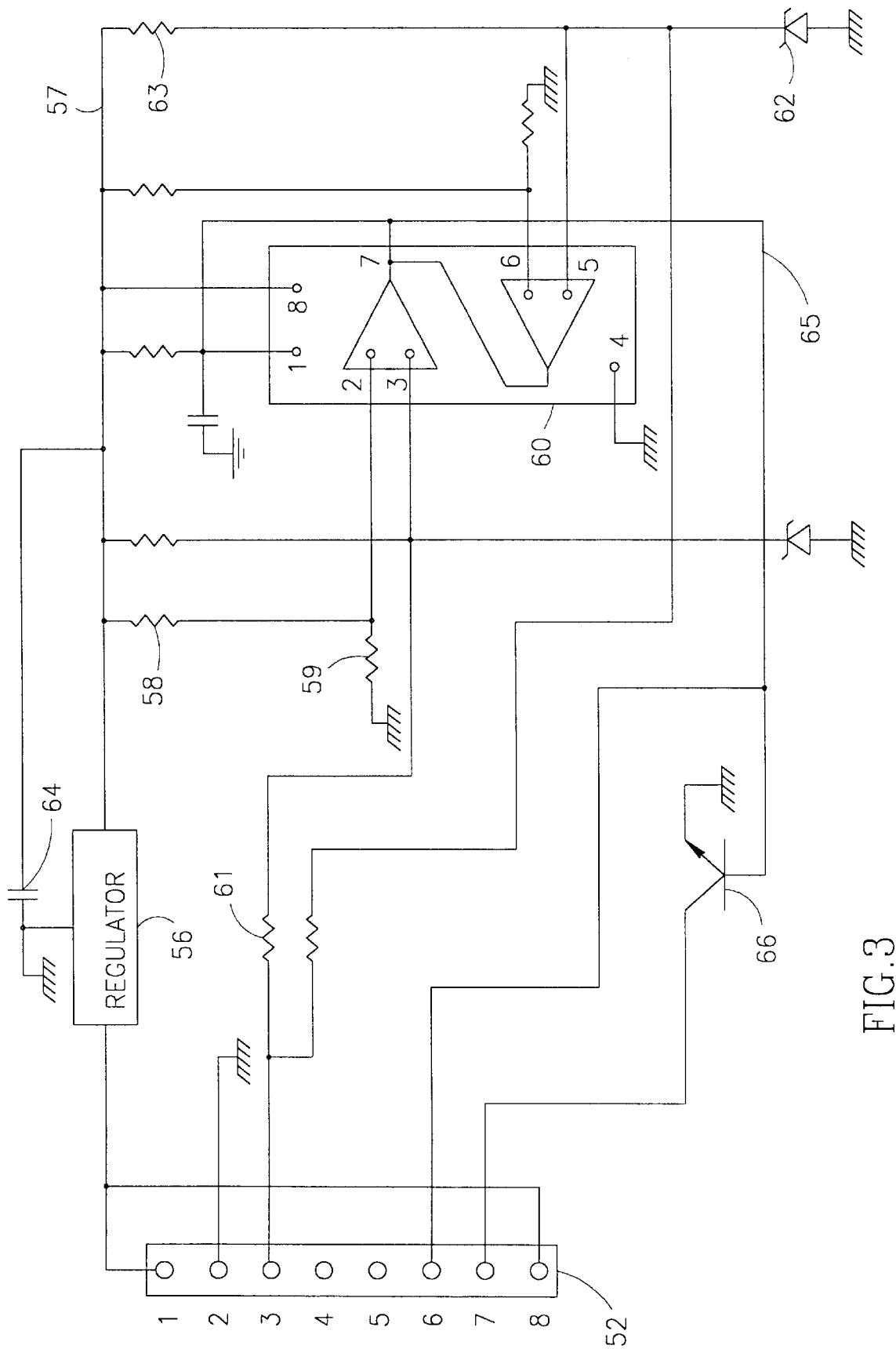
FIG. 3 shows schematically a detail of a differential comparator circuit used within the adapter.

Referring to FIG. 3 it is seen that the detector 52 comprises a low voltage d.c. rail 55 connected to the d.c. supply rail 34 shown in FIG. 2. A 6 V regulator 56 is connected between the low d.c. voltage rail 55 and ground such that there exists a regulated 6 V d.c. voltage between a stabilized voltage rail 57 of the regulator 56 and ground.

A first voltage divider comprising resistors 58 and 59 is connected between the stabilized voltage rail 57 and ground and has a common junction connected to a first inverting input (pin 2) of a dual comparator 60 so as to provide a reference voltage signal which is offset from the ground potential by a fixed amount. The common junction of the voltage divider shown in FIG. 2 is also connected via a resistor 61 to the first non-inverting input (pin 3) of the comparator 60. A 6 V Zener diode 62 is connected in series with a current limiting resistor 63 between the stabilized voltage rail 57 and ground, between which is connected a smoothing capacitor 64.

An output 65 (pin 7) of the comparator 60 is connected to the base of an NPN bipolar junction transistor 66 (constituting a "normally open switching circuit") whose emitter is connected to ground and whose collector is connected to the second normally open switch contact 45b shown in FIG. 2. The output 65 is also connected via a resistor 67 (shown in FIG. 2) to ground.

The rectifier diode 51 which is connected across the relay coil 46 shunts any high back e.m.f. generated by the coil 46 and thus avoids damage to the bipolar junction transistor 66.

In order to increase the security of the detector 52, the comparator 60 comprises dual comparators sharing a common output and connected in an analogous manner to the arrangement described above. The dual comparator may be constituted by an integrated circuit such as National Semiconductor's LM193 series.

The operation of the detector 52 is as follows. In a normal healthy condition, there is a large imbalance between the voltage at the virtual ground connection and the fractional feeder voltage which are respectively fed to the input pins of the comparator 60. Consequently, the output voltage of the comparator 60 is high so that the base voltage of the bipolar junction transistor 66 is high and the bipolar junction transistor 66 conducts. Thus, in a healthy condition, the bipolar junction transistor 66 functions as short circuit between its emitter and collector such that the normally open switch contact 45b is connected to ground.

When now the manual selector switch 42 is set to the "test" position (constituting a first position), the second pole 41b thereof is connected via the contact 43b to ground and thus the cathode of the rectifier diode 51 is also connected to ground via the normally closed switch contact 48b. Consequently, one end of the relay coil 46 is at ground potential via the normally closed switch contact 48b and the manual selector switch contact 43b, whilst the other end of the relay coil 46 is constantly connected to the unregulated d.c. rail 55. Thus, providing there exists a healthy condition when the manual selector switch is set to the first "test" position, the relay coil 46 is energized and the two pairs of switch contacts change state. In particular, the low voltage end of the relay coil 46 is maintained at ground potential via the rectifier diode 51 which is now connected to ground via the switch contact 45b as explained above.

At the same time, the 12 V d.c. level across the high voltage rail 34 is connected to the normally open switch contact 45a to the "healthy" indication lamp 50 which illuminates and provides a visual indication that the system is healthy. The manual selector switch may now be set to the second i.e. "normal" position, whereupon the high voltage rail 34 is connected via switch contact 44a to the first pole 41a of the manual selector switch 42 and, via the resistor 40, is connected to the base of the bipolar junction transistor 39. The bipolar junction transistor 39 thus conducts, allowing current to flow through the relay coil 38 which energizes and closes the switches 36 and 37, thereby connecting the inlet terminals 21 and 22 of the adapter 20 to the corresponding outlet terminals 23 and 24.

If there now occurs a ground fault such that the casing 27 of the appliance becomes live, then the differential voltage seen by the comparator 60 falls and its output 65 goes low. The transistor 66 is thus cutoff and its collector is no longer connected to ground. Consequently, the voltage applied to the normally open switch contact 45b (which is closed when the system is healthy) is no loner at ground potential and so the relay coil 46 de-energizes and the changeover switch contacts revert to the "fault" state shown in FIG. 2. In this state, the high voltage rail 34 is connected to the fault indication lamp 49 which illuminates a provides a visual indication that the system is faulty. At the same time, since the switch contact 45a is no loner connected to the high voltage rail 34, the first pole 41a of the manual selector switch goes low and the bipolar junction transistor 39 is cutoff. This de-energizes the relay coil 38 thereby tripping the supply between the inlet terminals 21 and 22 of the adapter 20 and the corresponding outlet terminals 23 and 24 thereof.

For the sake of completeness, it will be understood that if the manual selector switch 42 is set to the "normal" position without first testing the system when there exists a fault condition, then the output of the comparator 60 is low and the relay coil 46 will thus be de-energized. In this condition, the first "normal" contact 44a is disconnected from the high voltage rail 34 and so the first pole 41a of the manual selector switch 42 is also low. Thus again, the bipolar junction transistor 39 is cutoff, the relay coil 38 is de-energized and the switches 36 and 37 will not be closed.

There is thus provided in accordance with the invention a protection device for use in conjunction with an electrical appliance having an electrically conductive outer casing and which protects against the casing becoming "live" regardless of the state of a ground connection associated with an electrical socket to which the appliance is connected. When the protection device is in the form of an adapter as described above, the three connection terminals i.e. live, neutral and ground of the appliance are connected to an outlet of the adapter, although the adapter itself has only two inlet terminals. The adapter according to the invention is thus particularly suitable for use with electrical installations having inadequate grounding or, indeed, employing ungrounded two or three-pin socket outlets.

Furthermore, since the ground connection of the installation, if present, is in any case isolated from the adapter in that it is quite distinct from the virtual ground connection employed thereby, there is no longer any danger of electric shock if the actual ground of the installation becomes live owing to a breakdown in insulation between the live and ground feeders.

It will also be appreciated that, since the impedance of the appliance is negligible in comparison with the nominal impedance of the virtual ground loop (whose threshold is set to 250 K$\Omega$), the impedance of the virtual ground loop can be measured between the the virtual ground connection and either the live or neutral feeders.

Providing the protection device in the form of an adapter makes the device portable and independent of either the socket outlet or the appliance. However, it will readily be appreciated that the protection device may be made integral with either the appliance or the electrical socket outlet or the connection plug, if desired.

I claim:
1. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device being comprising:
   a virtual ground connection which is electrically floating with respect to the ground connection (GND) of the electrical supply, said virtual ground connection for electrically coupling to the casing of the electrical appliance instead of the ground connection of the electrical supply, and
   a differential comparator circuit for comparing a fraction of the voltage between the live and neutral connections with a voltage at the virtual ground connection of the appliance and producing a fault signal if a difference between said voltages exceeds a predetermined threshold.

2. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device comprising:
   a virtual ground connection which is electrically floating with respect to said ground connection (GND) of the electrical supply, said virtual ground connection for electrically coupling to the casing of the electrical appliance instead of the ground connection of the electrical supply, and
   a differential comparator circuit for comparing a fraction of the voltage between the live and neutral connections with a voltage at the virtual ground connection of the appliance and producing a fault signal if a difference between said voltages exceeds a predetermined threshold, further including:
   a main feeder interruption means operatively coupled to the differential comparator circuit and being responsive to the fault signal for opening a switching device connected in at least one of the live and neutral connections.

3. The protection device according to claim 2, wherein the main feeder interruption means is a contactor.

4. The protection device according to claim 2, wherein the main feeder interruption means is an earth leakage circuit breaker.

5. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device comprising:

a virtual ground connection which is electrically floating with respect to said ground connection (GND) of the electrical supply, said virtual ground connection for electrically coupling to the casing of the electrical appliance instead of the ground connection of the electrical supply, and a differential comparator circuit for comparing a fraction of the voltage between the live and neutral connections with a voltage at the virtual ground connection of the appliance and producing a fault signal if a difference between said voltages exceeds a predetermined threshold, wherein the differential comparator circuit comprises:

a first input connected to the virtual ground connection, and a second input connected to a common junction of a voltage divider including a pair or resistors connected in series between the live and neutral terminals of the supply feeder.

6. The protection device according to claim 5, wherein the differential comparator circuit further comprises:

an actuator operatively coupled to an output of the comparator and connected in series with the main feeder interruption means.

7. The protection device according to claim 6, wherein the main feeder interruption means includes a normally open switching circuit coupled to said switching device connected in at least one of the live and neutral terminals and being responsive to the fault signal for opening the switching device.

8. The protection device according to claim 6, wherein the differential comparator circuit includes at least two comparators having respective outputs which are commonly connected to said actuator.

9. The protection device according to claim 6, further including:

a d.c. supply having supply and ground rails, a normally open and normally closed switch contact being responsive to the actuator and having a common terminal, a manual selector switch having a first terminal connected to said normally closed switch contact and having a second terminal connected to the virtual ground connection, the normally open switch contact being connected between the virtual ground connection and the normally open switching circuit which is responsively coupled to an output of the differential comparator circuit, and the actuator being connected between the supply rail of the d.c. supply and the common terminal of the two-way switch;

the differential comparator circuit being designed so that under healthy conditions an impedance between the neutral terminal of the supply feeder and the virtual ground connection exceeds a predetermined threshold thus producing a voltage imbalance in the voltages applied to the first and second inputs of the differential comparator circuit which causes the normally open switching circuit to close, thereby connecting the virtual ground connection to the normally open switch contact, so that when the manual selector switch is in a first "test" position, the virtual ground connection is connected via the normally closed switch contact to the actuator which thus energizes and closes the normally open switch contact thereby connecting the virtual ground connection to the common terminal of the two-way switch and thus maintaining the actuator energized.

10. The protection device according to claim 9, further including:

a normally closed indication switch contact being responsive to the actuator and connected between the supply rail of the d.c. supply and a fault indication lamp that when the actuator is de-energized owing to a ground fault condition the fault indication lamp illuminates.

11. The protection device according to claim 9, further including:

a normally open indication switch contact being responsive to the actuator and connected between the supply rail of the d.c. supply and a healthy indication lamp that in the absence of a ground fault condition the actuator is energized and the healthy indication lamp illuminates.

12. The protection device according to claim 11, wherein the main feeder interruption means is connected to a collector of a bipolar junction transistor having a base thereof connected to the normally open indication switch contact so as to be connected to the supply rail of the d.c. supply when the actuator is energized.

13. The protection device according to claim 12, wherein:

the manual selector switch is a two-pole, two-way switch having a third terminal connected to the base of the bipolar junction transistor and having a fourth terminal connected to the normally open switch contact of the actuator so as to be connected to the supply rail of the d.c supply when the manual selector switch is in a second "normal" position and the actuator is energized.

14. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device comprising:

a virtual ground connection which is electrically floating with respect to said ground connection (GND) of the electrical supply, said virtual ground connection for electrically coupling to the casing of the electrical appliance instead of the ground connection of the electrical supply, and a differential comparator circuit for comparing a fraction of the voltage between the live and neutral connections with a voltage at the virtual ground connection of the appliance and producing a fault signal if a difference between said voltages exceeds a predetermined threshold, wherein the differential comparator is an integrated circuit.

15. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device comprising:

a virtual ground connection which is electrically floating with respect to said ground connection (GND) of the electrical supply, said virtual ground connection for electrically coupling to the casing of the electrical appliance instead of the ground connection of the electrical supply, and a differential comparator circuit for comparing a fraction of the voltage between the live and neutral connections with a voltage at the virtual ground connection of the appliance and producing a fault signal if a difference between said voltages exceeds a predetermined threshold, being an adaptor for coupling the appliance to an electrical socket outlet.

16. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device comprising:

a virtual ground connection which is electrically floating with respect to said ground connection (GND) of the electrical supply, said virtual ground connection for electrically coupling to the casing of the electrical appliance instead of the ground connection of the electrical supply, and a differential comparator circuit for comparing a fraction of the voltage between the live and neutral connections with a voltage at the virtual ground connection of the appliance and producing a fault signal if a difference between said voltages exceeds a predetermined threshold, being integral with an electrical socket outlet.

17. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device comprising:

a virtual ground connection which is electrically floating with respect to said ground connection (GND) of the electrical supply, said virtual ground connection for electrically coupling to the casing of the electrical appliance instead of the ground connection of the electrical supply, and a differential comparator circuit for comparing a fraction of the voltage between the live and neutral connections with a voltage at the virtual ground connection of the appliance and producing a fault signal if a difference between said voltages exceeds a predetermined threshold, being integral with an electrical plug.

18. A protection device for use in conjunction with an electrical appliance having an electrically conductive outer casing and which protects against the casing becoming "live" regardless of the state of a ground connection (GND) associated with an electrical supply to which the appliance is connected, the electrical appliance having live and neutral terminals for feeding current to the appliance from respective live and neutral feeders of the electrical supply, said device comprising:

a virtual ground connection which is electrically floating with respect to said ground connection (GND) of the electrical supply, said virtual ground connection for electrically coupling to the casing of the electrical appliance instead of the ground connection of the electrical supply, and a differential comparator circuit for comparing a fraction of the voltage between the live and neutral connections with a voltage at the virtual ground connection of the appliance and producing a fault signal if a difference between said voltages exceeds a predetermined threshold, being integral with the appliance.

* * * * *